United States Patent

Anderson

[11] 4,052,184
[45] Oct. 4, 1977

[54] CONTOURING GLASS SEAL EDGE

[75] Inventor: Joseph W. Anderson, Corning, N.Y.

[73] Assignee: Corning Glass Works, Corning, N.Y.

[21] Appl. No.: 669,479

[22] Filed: Mar. 23, 1976

[51] Int. Cl.² .............................................. C03B 21/00
[52] U.S. Cl. ........................................ 65/102; 65/108; 65/110
[58] Field of Search .................. 65/108, 102, 110, 107

[56] References Cited

U.S. PATENT DOCUMENTS

| 6,886 | 2/1876 | Atterbury | 65/108 |
| 7,747 | 6/1877 | Atterbury | 65/108 |
| 406,692 | 7/1889 | Atterbury | 65/110 |
| 2,819,561 | 1/1958 | Henry et al. | 65/58 X |
| 2,970,405 | 2/1961 | Giffen | 65/45 X |
| 3,825,413 | 7/1974 | Schwartz | 65/58 X |

Primary Examiner—S. Leon Bashore
Assistant Examiner—Frank W. Miga
Attorney, Agent, or Firm—Burton R. Turner; Clarence R. Patty, Jr.

[57] ABSTRACT

In the sealing of two glass surfaces together in the formation of a hermetically sealed hollow article, it is important that the opposed seal edges be uniformly complementary along their sealing extent, and a method of sagging the seal edge to a desired surface contour is disclosed.

8 Claims, 2 Drawing Figures

CONTOURING GLASS SEAL EDGE

BACKGROUND OF THE INVENTION

In the past it has been known to seal panels and funnels together to form a bulb for a TV picture tube. The sealing edges of the panels and funnels were separately ground to a flat plane and then acid fortified to eliminate the detrimental effects of cracks and crazings caused by the grinding operation. The funnels and panels were then subsequently sealed together along such finished seal edges by means of a frit, which upon the application of heat, fused and hermetically sealed the funnels and panels together.

The present invention sets forth a novel method of eliminating and grinding and acid polishing step heretofore required, and accordingly overcomes the environmental problem of disposing waste etching acids, by substituting a thermally controlled edge contouring step for reshaping the sealing edges to a desired uniform surface contour.

SUMMARY OF THE INVENTION

In its simplest form, the present invention is directed to a method of contouring a seal edge of a glass article by thermally cycling such article to sag such seal edge into a desired surface contour for sealing without adversely affecting physical and dimensional properties of the article.

The invention has particular application to the sagging of the seal edges of funnels for color cathode ray tubes, so as to conform to a mating or opposed seal edge portion of a panel when forming a TV bulb. Although the invention has application with respect to the formation of a planar sealing edge as utilized in conventional TV bulbs, it has particular application in forming the desired uniform curvature on the sealing edge of the newly announced TV bulbs as shown in U.S. Pat. No. 3,904,914, wherein the sealing edge has a curvilinear contour.

Whether the sealing edge of the funnel is to be sagged into a planar contour or a curvilinear contour, a glass-ceramic sagging mold is formed with the desired surface contour in accordance with the invention set forth in U.S. application Ser. No. 659,698 filed Feb. 20, 1976 by Wendell C. Andrews, entitled Mold and Method of Forming, which application is assigned to the assignee of the present invention. The glass article is then positioned upon the mold having the desired surface contour and subjected to a heat treatment such that the sealing edge surface gravitationally conforms to the surface contour of the glass-ceramic mold while maintaining the dimensional integrity and desired physical properties of the article. Since deformation is a time-temperature relationship, the sagging cycle is controlled to quickly heat the article to its sagging temperature, remain at such sagging temperature only long enough to conform the sealing edge surface to the contour of the mold, reduce the temperature to the annealing temperature of the glass, and maintain the temperature within the transformation range between the annealing point and strain point for a sufficient period of time to eliminate the generation of internal surface stresses in the article, and finally the article is cooled from the strain point to room temperature.

It thus has been an object of the invention to provide a process for sagging the sealing edge of a glass article to a desired contour without detrimentally affecting other physical or dimensional properties of the article and thereby eliminating the necessity of grinding and acid fortifying such sealing edge.

DESCRIPTION OF THE PREFERRED EMBODIMENTS

Figure 1:
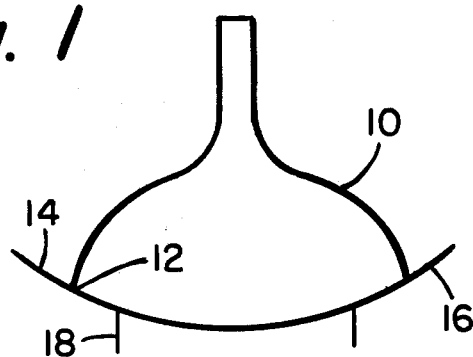
FIG. 1 is a schematic view illustrating a TV funnel positioned upon a sagging mold.

In contouring the seal edge of a glass article in accordance with the present invention, the article, such as a funnel 10 of a TV bulb, having a sealing edge 12, is positioned upon the contoured surface 14 of a glass-ceramic sagging mold 16. The mold 16 may be carried by suitable supports 18, and the surface 14 is provided with a predetermined contour such that upon sagging, the seal edge 12 of funnel 10 uniformly conforms to the desired surface contour 14 of the mold 16.

In view of the fact that sagging deformation is a time-temperature relationship, it is necessary to utilize a sagging cycle which permits the desirable deformation or sagging of the seal edge to the required contour while inhibiting undesirable deformation to the periphery of the funnel and the funnel yoke and neck areas which affect the electron gun alignment and beam clearance. Further, in view of the fact that the mold 16 closes off the large open mouth portion of the funnel 10, after sagging the interior surface of the funnel tends to cool slower than the outer surface, thus resulting in undesirable tensile stresses on the inner surface which must be eliminated by slowly cooling the funnel through the transformation range (i.e. between the annealing point temperature and the strain point temperature), and thereby control stress generation within such range and provide the necessary stress release. Whereas the cooling rate through the transformation range may be in the order of only about 2° C./minute to obtain proper inner surface stress control, faster cooling rates on the order of 20° C./minute or more may be utilized to cool from the strain point temperature down to room temperature or the temperature at which such funnels are transferred from the sagging-anneal conveyor.

As previously mentioned, a sagging cycle must be utilized which provides the desired results, and accordingly if a sagging temperature is utilized which is too low, no movement of the seal edge will take place within a reasonable period of time, whereas if a sagging temperature is utilized which is too high or if retained for an extended period of time, the seal edge will quickly gravitationally conform to the desired surface contour of the sagging mold but undesirable deformation causes other properties of the funnel such as beam clearance and periphery integrity to be detrimentally affected. An initial rapid heatup is desirable to shorten the cycle time and quickly bring the glass article to an operative sagging temperature, and in this regard, an average heat-up rate of about 40° C./minute produced good results. The actual sagging time and temperature utilized will of course vary with the particular glass composition of the article being sagged, however sagging temperatures should be between the annealing point temperature and the softening point temperature of the glass. Undesirable deformation takes place as the sagging temperature approaches the softening point temperature and virtually no deformation takes place as the sagging temperature approaches the annealing point temperature of the glass, however it appears that suitable results are obtained when sagging temperature is utilized which is within the range of about ⅓ to ⅔ of the temperature range between the annealing point temperature and the softening point temperature of the glass being sagged. Generally, the sagging temperature utilized will not greatly exceed 100° C. above the annealing point temperature. In order to inhibit undesirable deformation of the glass article, the sagging temperature should be maintained only long enough to gravitationally conform the seal edge of the article to the contoured surface of the glass-ceramic sagging mold, and not over ½ hour and preferably under ¼ hour.

Figure 2:
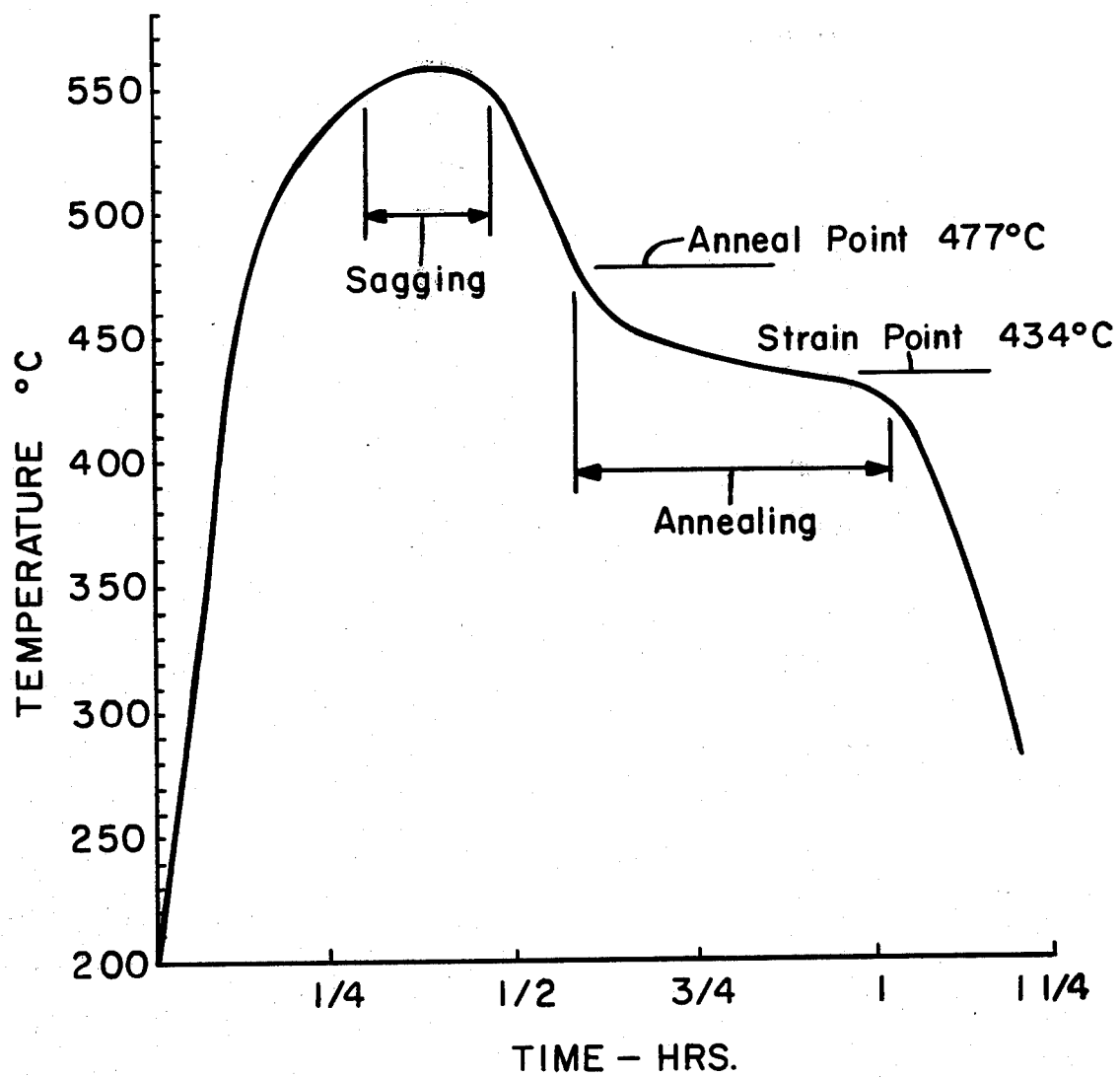
FIG. 2 is a time-temperature graph of a representative sagging-annealing cycle for contouring a sealing edge in accordance with the present invention.

Although by no means limiting in nature, the following specific example is given of a now preferred embodiment of my invention which produces good seal edge tolerances. A glass-ceramic sagging mold made in accordance with the invention disclosed in said aforementioned application Ser. No. 659,698 was provided with a sagging surface having the desired contour of the seal edge of a TV funnel. An as-formed funnel of typical TV funnel glass composition, similar to that disclosed in U.S. Pat. No. 2,527,693 and having a strain point of 434° C. and an anneal point of 477° C. was positioned upon the contoured surface of the sagging mold and subjected to the following sag-anneal cycle, which is graphically illustrated in FIG. 2:

| | |
|---|---|
| Heatup to a sagging temperature of 558° C. | 18 min. |
| Sag time at 558° C. | 8 min. |
| Cool from sag temperature (558° C.) to anneal point (477° C.) | 12 min. |
| Cool through transformation range (477° C. – 434° C.) | 20 min. |
| Cool from strain point (434° C.) to exit end of lehr tunnel (240° C.) | 16 min. |
| Cool from exit end of lehr to discharge apron (elevated room temperature) | 20 min. |
| Total Time | 94 min. |

A series of comparison tests were run with both 19 inch and 25 inch TV funnels, and it was found that 99.5% of the sagged 19 inch funnels were within 0.008 inch of a desired perfect surface contour, whereas only 68.5% of such as-formed funnels were within such range. With respect to the 25 inch funnels, 99.8% of the sag funnels were within 0.014 inch of the desired contour whereas only 37.5% of the as-formed funnels fell within such range. Accordingly, it can be seen that the sagging operation does in fact materially enhance the sealing edge contour of the funnel so as to facilitate the formation of a hermetic seal between the funnel and panel.

Although the now preferred embodiments of the invention have been disclosed, it will be apparent that those skilled in the art that various changes and modifications may be made thereto without departing from the spirit and scope thereof as defined in the appended claims.

I claim:

1. A method of conforming the seal edge of a one-piece glass article to a desired surface contour which comprises, providing a glass-ceramic sagging mold with a surface contour equivalent to the desired contour of said seal edge, positioning said one-piece glass article upon the contoured surface of such sagging mold, rapidly heating said mold and said glass article to a sagging temperature between the annealing point temperature and softening point temperature of the glass composition from which said article is formed, maintaining such temperature for a time sufficient to gravitationally conform said seal edge of said article to the contoured surface of said sagging mold, rapidly cooling said article to its annealing point temperature, maintaining said article in the transformation range between its annealing point temperature and strain point temperature for a time sufficient to inhibit the generation of internal surface stress on said article, and then rapidly cooling said article to handling temperature.

2. A method of conforming a seal edge of a glass article to a desired surface contour as defined in claim 1 including a step of rapidly heating said mold and article at an average heat-up rate of about 40° C./minute to the sagging temperature.

3. A method of conforming a seal edge of a glass article to a desired surface contour as defined in claim 1 including the step of heating said glass article to a sagging temperature within a range of about ⅓ and ⅔ of the temperature range between the annealing point and softening point of the glass.

4. A method of conforming a seal edge of a glass article to a desired surface contour as defined in claim 1 wherein the glass article is raised to a sagging temperature within about 100° C. above the annealing point temperature of the glass article.

5. A method of conforming a seal edge of a glass article to a desired surface contour as defined in claim 1 including the step of cooling said article through the transformation range at a rate of about 2° C./minute.

6. A method of conforming a seal edge of a glass article to a desired surface contour as defined in claim 1 wherein the article is cooled from the strain point temperature to a handling temperature at an average rate of at least about 20° C./minute.

7. A method of conforming a seal edge of a glass article to a desired surface contour as defined in claim 1 wherein the glass-ceramic sagging mold is provided with a curvilinear surface contour.

8. A method of conforming a seal edge of a glass article to a desired surface contour as defined in claim 1 wherein the sagging time after reaching said sagging temperature does not exceed ¼ hour.

* * * * *